Oct. 22, 1963  J. P. CHISHOLM  3,108,275
FREQUENCY SHIFT REFLECTION SYSTEM
Filed Nov. 1, 1960
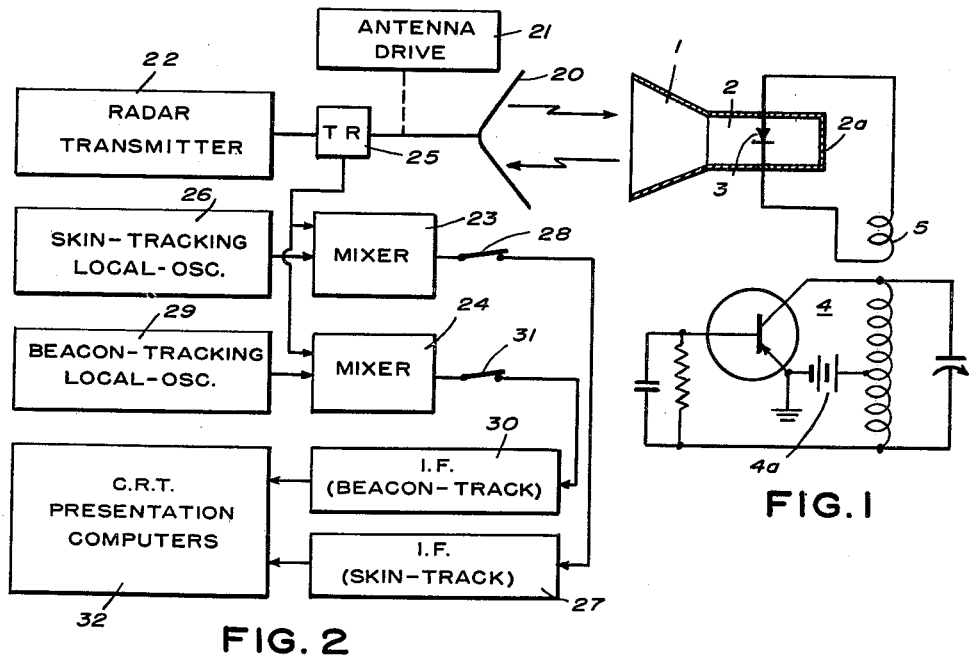
FIG. 1
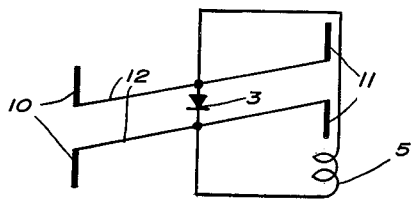
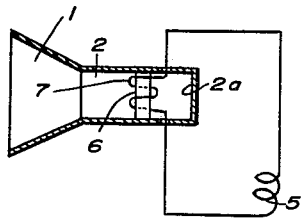
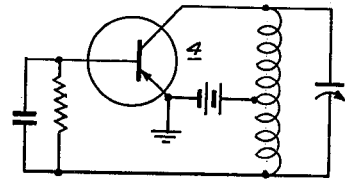
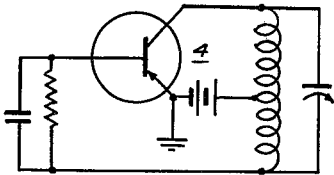
FIG. 2
FIG. 3
FIG. 4
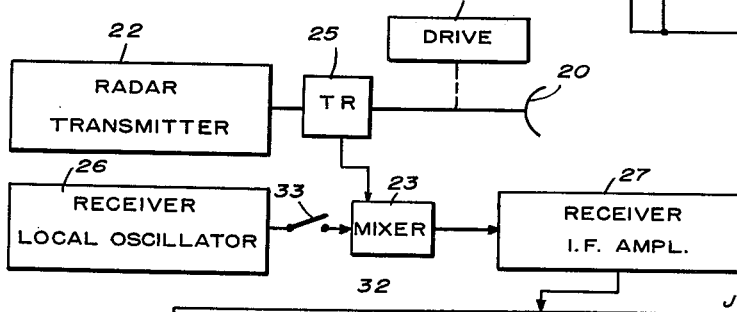
FIG. 5
INVENTOR
JOHN P. CHISHOLM
BY Alexander & Dowell
ATTORNEYS

United States Patent Office 3,108,275
Patented Oct. 22, 1963

3,108,275
FREQUENCY SHIFT REFLECTION SYSTEM
John P. Chisholm, Buffalo, N.Y., assignor to Sierra Research Corporation, Buffalo, N.Y., a corporation of New York
Filed Nov. 1, 1960, Ser. No. 66,547
20 Claims. (Cl. 343—18)

This invention relates to improved radar target reflection means and to an improved radar system including said reflection means.

In the tracking of targets employing high frequency radar reflection techniques, there are a plurality of effects which make the interpretation of received echo signals more difficult and which introduce errors detracting from tracking accuracy. For example, in precision aircraft landing systems a phenomenon known as target scintillation is particularly disturbing, this scintillation effect referring to the shifting-about on the surfaces of an aircraft of the principal reflective areas as the aircraft's attitude in space varies as viewed from the location of the radar. The apparent tracking center, the locus of the principal wave reflection, wanders all over the aircraft and makes it appear that the aircraft is itself wandering correspondingly in space. In landing systems where the accuracy of the system must be maintained within a very few feet, for instance in aircraft carrier landing systems, this apparent wandering is of major concern. One basic way to eliminate target scintillation is to make one locus on the aircraft distinctively different from all others, i.e. by size or reflectivity of one area; or by Doppler frequency identification; or by a chopping effect as by using a rotating reflector; or by mechanically modulating a reflector as suggested in U.S. Patent 2,461,005 to Southworth; or by using a beacon having identifiable transponder capabilities. This latter means, although the most distinctive, has usually been considered less desirable because inherent time delays can introduce a tracking error, but principally because of the greater complexity it adds to the aircraft which at the same time reduces reliability in proportion to complexity.

It is a principal object of this invention to provide an improved radar and reflector system which provides maximum uniqueness of identification of a target point having a fixed position on the aircraft, but which introduces no delay-type tracking errors. It is a corollary object of major importance to provide a frequency-shift reflector which is very small, as compared with conventional corner-reflectors currently in use on aircraft to prevent scintillation effects, and which frequency-shift reflector employs a very simple and reliable semiconductor oscillator coupled to the reflector by some type of impedance means capable of electrically changing its reflective characteristics at a radio-frequency rate. The frequency-shift reflector comprises an antenna, and said antenna being terminated in an electrical switching device, the switching condition of which is controlled by the semiconductor oscillator.

Considering the radar system as a whole, it will be apparent that the reflections from the reflector will include a component at the frequency $fr$ of the radar and side band components of this frequency modulated at the frequency $fm$ of the reflector-coupled oscillator, i.e. $fr+fm$, $fr-fm$. In addition, the other reflective surfaces of the aircraft will reflect large amounts of energy at the radar frequency $fr$, but these large amounts of energy will be subject to scintillation effects as the attitude of the aircraft shifts in space. It is therefore necessary to the success of the system to discriminate between the modulated received signals and the unmodulated reflections returning at the radar frequency $fr$.

It is another principal object of this invention to provide a system including a radar and a remotely located frequency-shift reflection target in which the frequency-rejection capabilities of the radar receiver band width are used to eliminate from the received signals the radar transmitted components $fr$ and one of the side bands, either $fr+fm$ or $fr-fm$, while passing the other selected side band to be amplified. Since the radar receiver must necessarily have a pass-band characteristic of appreciable band width, it is therefore necessary that the frequency $fm$ of the oscillator controlling the electrical switching means in the reflector be quite high so that the selected side band can be amplified within the I.F. pass band of the receiver while the nonselected side band and the radar frequency $fr$ components will be rejected because they fall outside of said I.F. pass band.

For instance, in the working embodiment of the present invention, an X-band radar was used with a frequency $fr$ of about 9,000 megacycles. The oscillator frequency $fm$ in the frequency-shift reflector was variously set at radio-frequencies between 30 and 100 megacycles so as to provide rejections of between 50 and 100 decibels for the non-selected reflected frequency components, the amount of rejection of these components at various values of frequency $fm$ depending upon the bandwidth of the intermediate-frequency amplifier in the radar receiver. At any rate, electrical switching in the reflector is necessary because of the high frequency $fm$ required, and thus mechanical modulators such as are taught by Southworth in Patent 2,461,005, supra, are not applicable to the present purpose. As the low-modulation rate of which the Southworth reflectors are capable, great confusion would result between reflector-modulated radar echos and propellor blade-modulated echos, for example. In any event, rejections of 50 decibels or more appear advisable since the skin reflections at frequency $fr$ may be at a much higher power level as viewed by the receiver than the modulated beacon reflections at frequencies $fr+fm$ and $fr-fm$.

It is to be particularly noted that by eliminating the radar frequency components $fr$ from the received reflections, ground clutter and rain clutter are automatically eliminated and the problems of low-angle tracking are also reduced. When employing the present frequency-shift reflection system, the principal effect of rain is attenuation, and this attenuation must be considered in selecting the size and over-all reflectivity of the airborne reflector and when determining the power required at the radar transmitter and the effective range of the system.

There are several ways of eliminating the radar frequency $fr$ component of the received echos. Obviously it is desirable to have a dual-capability radar capable of skin-tracking the aircraft by following echos at frequency $fr$, especially where the aircraft is out beyond the landing approach path of the system, but also capable of beacon-tracking the frequency-shift reflector during close-in landing-approach conditions. Dual capability radars meeting these general requirements are known in the prior art, and may comprise either two I.F. strips tuned to different frequencies, two differently-tuned local oscillators selectively coupled to the receiver mixer, or both. Alternatively, a simpler radar receiver having only one local oscillator and one I.F. strip can be used if the frequency $fm$ of the frequency-shift reflector oscillator is equal to the I.F. frequency of the radar receiver. With this combination of units in the system, the radar normally skin-tracks the aircraft with the beacon-tracking signal superimposed thereon. However, when beacon-tracking alone is desired, the local oscillator in the radar receiver is turned off, and the received echo components including the radar frequency $fr$ and a side band $fr+fm$ or $fr-fm$ beat together in the receiver mixer to produce an intermediate-frequency signal containing the only beacon-tracking information. There are other radar means which can be used to provide either skin-tracking or beacon-tracking capabilities.

The present system is not limited to uses connected with the automatic landing of aircraft, but is capable of a number of other uses. For example, as is the case with the Southworth Patent 2,461,005, supra, the present system provides means for identifying a particular beacon target, for instance for ship navigation. One difference between this system and the above mentioned Southworth system is that in the reference Southworth both the modulated and the unmodulated echo components returning to the radar receiver are amplified by the I.F. strip in the receiver, and no effort is made to exclude one component while passing another component employing the I.F. rejection characteristics of the receiver. In the reference Southworth, the components are of similar frequency, and distinguished from each other only by the presence or absence of modulation components which are substantially within the range of audio frequencies to which a mechanical diaphragm can respond.

As in the case of the aircraft landing system, if the present frequency-shift reflector and dual-capability radar system is used as a navigational aid, an additional advantage is gained by the present invention over the mechanically modulated beacon of the prior art because a navigational aid equipped with one of the present frequency-shift receivers can be separately and uniquely viewed on the beacon-function of the radar so that only that particular aid to navigation stands out on the indicator unit. The ground clutter and rain return are both eliminated when the radar operates on the becon-tracking function since ground clutter and rain return are received at the radar frequency, which frequency will be rejected by the I.F. amplifier in favor of the modulated return from the frequency-shift reflector.

Another advantage of the persent system would lie in the reduction of likelihood of jamming the present landing system by frequencies generated by hostile parties, because from the viewpoint of an outsider monitoring the frequency of the present radar, the frequency $fr$ would appear to be used by the system, whereas in fact the system receiver would be tuned to another frequency differing from the radar transmitted frequency $fr$ by an amount equal to the frequency of the oscillator contained within the frequency-shift reflector. Thus, the present system provides both unique identification of a target, and also elimination of other echos which serve merely to obscure the target echo and which are returned to the radar at the transmitted frequency $fr$ rather than at the shifted frequency.

It is the extreme simplicity and the reliability of a simple antenna having a crystal coupled in such a way as to change the reflection characteristics of the antenna, and a simple semiconductor oscillator for alternately shorting and opening the crystal circuit, which makes the present system attractive for use in connection with the landing of aircraft. Only a simple horn having a short length of wave guide with a crystal disposed thereacross and having a small oscillator to bias the crystal on and off is required in order to uniquely mark the position of a point target on the aircraft. The amount of power required in the semiconductor oscillator to bias the crystal on and off depends upon the power of the radar waves reaching the antenna. In general, however, a power of 100 milliwatts proved to be entirely adequate in a landing system employing an X-band radar with a transmitter power of 500 killowatts. A numerical example appears below in the present specification indicating the amounts of power returned to the radar receiver under exemplary circumstances.

Other objects and advantages of the invention will become apparent during the following discussion of the drawing, wherein:

FIG. 1 is a schematic diagram illustrating one embodiment including an antenna, a crystal switching means for changing the reflectivity of the antenna, and a simple high-frequency oscillator for biasing the crystal alternately on and off;

FIG. 2 is a block diagram illustrating a dual-capacity radar suitable for use in connection with the present invention for either skin-tracking or beacon-tracking a frequency-shift reflector;

FIG. 3 is a schematic diagram illustrating a frequency-shift reflector similar to FIG. 1 but showing a ferrite switching device in place of the crystal switching device;

FIG. 4 is a schematic diagram of still another embodiment of the invention and illustrating a Van Atta array type reflector in which the reflectivity of the array is cyclically varied by the output of an oscillator connected across the crystal in a manner similar to the reflector system shown in FIG. 1; and FIG. 5 is a block diagram illustrating another embodiment of a radar suitable for use in the present system and somewhat simpler than the radar of FIG. 2.

Referring now to the drawing, FIGS. 1 and 3 show simple wave-guide horns bearing the reference numeral 1, each horn being flared at one end and being coupled at the other end to a short section of wave guide 2 having a closed opposite end 2a. It is not necessarily a requirement that the end 2a of the wave guide be closed, in view of the fact that by properly selecting the length and shape of the wave guide connected with the horn, the wave guide could also be left open. The cavity formed by the wave guide 2 need not be tuned to resonance, although a resonant cavity is within the scope of the present invention.

A short-circuiting means is shown across the wave guide comprising in the case of FIG. 1 a semiconductor crystal 3 which can be biased on or off by the application of voltage across the crystal. A simple 3-point oscillator generally designated by the reference numeral 4 is capable of generating such bias, the oscillator being coupled to the crystal by a pickup coil 5 having its two ends connected across the crystal. In the case of FIGS. 1, 3 and 4 a simple semiconductor Hartley oscillator circuit is employed by way of illustration rather than limitation. Such circuits at the present stage of development in the semiconductor art can be made to oscillate at least at frequencies up to 1000 megacycles. In order to increase the dependability of the present reflectors, the battery 4a powering the oscillator may comprise a mercury cell, which cell can be conveniently located in the beacon reflector and will last indefinitely since the drain therefrom is extremely small, especially if a simple switch (not shown) is provided in series with the battery. The horn 1 and the wave guide 2 are very small when used in connection with microwave techniques. The aperture of the horn used to receive and re-radiate X-band frequencies is flared to have an aperture dimension of 2″ x 3″, although a smaller horn can be used if a lesser range is tolerable. Again, see the numerical example below in the specification.

The crystal across the wave guide in the working embodiment is a 1N23C, and the power of the transmitter oscillator was set at 100 milliwatts. The entire reflector system, including the horn, the section of wave guide, the crystal and the oscillator fits easily in the palm of a person's hand, and is completely self-contained. Such a reflector can easily be protected by placing it behind a Plexiglas window, or any other protective sheet material so as to prevent the entry of rain and snow etc. thereinto. In most cases such a reflector can be structurally incorporated into the aircraft carrying it.

The total flare on the horn used in the numerical example set forth below is 30°.

FIG. 3 shows a modified form of frequency-shift reflector similar to FIG. 1 but employing a ferrite strip 6 as the switching element in place of the crystal 3. The magnetic properties of the ferrite strip 6 are altered by the output from the oscillator 4 coupled by the coil 5 into the winding 7 wound on the ferrite strip. As of the present time, however, the ferrites cannot be operated at as high a switching frequency as the diode 3 shown in FIG. 1.

With respect to FIG. 4, a portion of a Van Atta array of the general type shown in U.S. Patent 2,908,002 is illustrated including two sets of dipoles 10 and 11 coupled together by a transmission path including the conductors 12, which path is short-circuited by a crystal 3 coupled with an oscillator 4 by a coil 5 precisely in the manner illustrated in FIG. 1.

The present invention is, however, not to be limited to any particular form of antenna, but can be extended to other antennas employing, for instance, dipoles in front of a parabola, or even a slotted wave-guide antenna. Also, the transmission paths and/or resonant tuned circuits can be either individual conductors or else the conductors of wave guide means. The important thing is that the reflectivity of the antenna be altered between as wide limits as possible at a controlled identifiable rate by some suitable switching means. The antenna may be either tuned or untuned to resonance at the frequency of the transmitted wave. In the numerical example described below no effort was made to tune the reflector, and the results were still quite satisfactory. A certain amount of beam width in the coverage of the reflecting antenna is necessary in view of the fact that the attitude of the aircraft with respect to the radar can change considerably due to turning or yawing, etc.

Referring now to the dual-capability radar shown in block diagram form in FIG. 2, this radar comprises an antenna 20, the position of which can be controlled by a suitable antenna drive 21, and the antenna being coupled both with the radar pulse transmitter 22 and a simplified representation of a radar receiver comprising two different mixers 23 and 24, the coupling to these antennas being obtained through a conventional TR box 25. The mixer 23 is connected to receive power from a local oscillator 26 and is coupled to an I.F. strip 27 through a switch 28, the purpose of which will appear presently. The local oscillator 26 and the I.F. strip 27 are tuned to provide ordinary radar tracking, referred to herein as skin-tracking; meaning that the transmitted pulse is reflected back from the skin of the aircraft, is mixed with the signal from the local oscillator 26, and passes through the I.F. strip 27 in the conventional manner. The other mixer 24 is used for beacon-tracking and is connected to receive a signal from a beacon-tracking local oscillator 29 and to deliver a mixed output signal to a beacon-tracking I.F. strip 30, the mixer 24 being coupled with the I.F. strip 30 by way of a switch 31. The beacon-tracking local oscillator 29 and the I.F. strip 30 can be similar respectively to the oscillator 26 and the I.F. strip 27 except that they are tuned to a different frequency separated therefrom by the frequency of the oscillator 4 in the frequency-shift reflector which is being interrogated. Thus, when the switch 28 is closed and the switch 31 is open, the radar performs a pure radar function and indicates the position of aircraft merely by the reflection of the transmitted pulse at frequency $fr$ from the skin of the aircraft, the block diagram illustrating a box 32 marked cathode ray tube presentation and computers. On the other hand, if the switch 28 is open and the switch 31 is closed, no indication wil be presented on the unit 32 of any signals which are reflected in the normal manner of a radar from any object whether it be the skin of an aircraft or other stationary or moving targets. Instead, the local oscillator 29 and the I.F. strip 30 are tuned in such a manner that only signals received at the radar and having a frequency, of $fr+fm$ or $fr-fm$, displaced from the frequency $fr$ of the pulse transmitter 22 by an amount equal to the frequency $fm$ of the frequency-shift reflector oscillator 4 will be presented on the unit 32. Alternatively, if both the switches 28 and 31 are closed, both signals could be presented simultaneously on either the same or on two separate presentation units.

FIG. 5 shows a block diagram of a radar wherein parts which are similar to those in FIG. 2 bear the same reference characters. In FIG. 5, there is only one I.F. frequency and one local oscillator 26, joined by switch 33 to the mixer. When the switch is closed, the radar performs normal skin-tracking functions. When the switch 33 is open the I.F. amplifier passes only $fr\pm fm$, where $fm$ equals the I.F. frequency, and hence the radar is sensitive only to a beacon with an oscillator 4 tuned to this I.F. frequency.

As stated above, other possible combinations of elements can be employed to make a radar unit capable of tracking only a frequency-shift reflector of the type set forth in the present invention or capable of tracking either that type of beacon, or skin tracking, or both.

As an illustrative example, the following numerical case is presented. The radar shown in the block diagram of FIG. 2 for purposes of this illustration is assumed to be an X-band radar operating at approximately 9000 megacycles. The beam width of the antenna 20 is assumed to be 1°, and the X-band horn 1 of the remote beacon is assumed to be a 15 db horn whose mouth dimensions are 2" x 3". Assuming an instantaneous range of 2 miles, the following conditions would hold true:

Power loss at 2 miles at X-band between two isotropic radiators _____ db__ −122
Gain of transmitting antenna 25 _____ db__ +39
Gain of reflector antenna 1 _____ db__ +15
Power level radiated by radar _____ dbm__ +85
Resultant power incident in the beacon antenna _____ dbm__ +17

Assuming a modulation loss of 10 db:

Side band power reflected _____ dbm__ +7
Reflector antenna gain _____ db__ +15
Radar antenna gain _____ db__ +39
Power loss at 2 miles _____ db__ +122
Power received by radar receiver _____ dbm__ −61

This received power of −61 dbm is about 39 db above the minimum discernible signal of −100 dbm of a good radar receiver in an X-band range. With equipment of the type set forth above, very satisfactory tracking of the frequency-shift reflector out to a range of 6 miles was achieved, and it is estimated that tracking could probably have been successfully conducted to a range of 16 miles. In this particular instance, the skin tracking I.F. strip 27 was tuned to 60 megacycles, and the beacon-tracking I.F. strip 30 was tuned to 90 megacycles. Thus, a 30-megacycle fixed-frequency difference between these two I.F. strips provided adequate rejection of the non-desired reflection components for purposes of beacon tracking. Obviously, a much larger horn having a greater gain would provide a much more powerful reflecting signal, but it is not believed that the greater power is necessary in automatic landing systems. As stated above, it is the very small size and simplicity of the present frequency-shift reflector system which makes it particularly desirable for use in connection with aircraft.

The present invention is not to be limited to any particular operating frequency bands or to any particular antenna configurations, provided, however, that the antenna selected can have its reflection characteristics changed by electrically-operated switching means capable of performing the switching function at a high-frequency rate.

I do not limit my invention to the exact forms shown in the drawings, for obviously changes may be made therein within the scope of the following claims.

I claim:
1. A beacon-responsive radar system comprising the combination of a radar including a high-frequency transmitter and a receiver; and a beacon comprising an antenna for receiving and reflecting said high-frequency, radio-frequency generating means, and modulating means connected with said antenna and coupled to said generating means and actuated thereby to modulate the reflectivity of the antenna at said radio-frequency rate.

2. A ground-controlled-approach aircraft landing system including the combination as set forth in claim 1, wherein the radar is located on the ground and the beacon is located on the aircraft, said antenna being directional and facing forwardly thereof.

3. A beacon-responsive radar system comprising the combination of a radar including a high-frequency transmitter and a receiver having a predetermined bandwidth; and a beacon comprising an antenna for receiving and reflecting said high-frequency, generating means for generating a radio frequency at least as great as the bandwidth of said receiver, and switching means connected with said antenna and coupled to said generating means and actuated thereby to modulate the reflectivity of the antenna at said radio-frequency rate.

4. A ground-controlled-approach aircraft landing system including the combination as set forth in claim 3, wherein the radar is located on the ground and the beacon is located on the aircraft, said antenna being directional and facing forwardly thereof.

5. A beacon-responsive radar system comprising the combination of a radar including a high-frequency transmitter and a receiver having a predetermined intermediate frequency; and a beacon comprising an antenna for receiving and reflecting said high-frequency, generating means for generating a radio frequency equal to an integral multiple of said intermediate frequency, and switching means connected with said antenna and coupled to said generating means and actuated thereby to modulate the reflectivity of the antenna at said radio-frequency rate.

6. A ground-controlled-approach aircraft landing system including the combination as set forth in claim 5, wherein the radar is located on the ground and the beacon is located on the aircraft, said antenna being directional and facing forwardly thereof.

7. In a system as set forth in claim 5, said receiver having a local oscillator tuned to a frequency differing from the transmitter high frequency by said intermediate frequency, and switch means for turning off said local oscillator, whereby only echo signals modulated at said radio-frequency rate will be mixed in said receiver and passed therethrough at said intermediate frequency.

8. A beacon-responsive radar system comprising the combination of a dual-capability radar including a high-frequency transmitter and a receiver having a first receive-frequency tuned to the transmitter frequency and having a second receive-frequency separated from the first receive-frequency by a fixed frequency so related to the bandwidth of the receiver that the receiver can reject echos on one receive-frequency when tuned to the other receive-frequency; and a beacon comprising an antenna for receiving and reflecting said high-frequency, generating means for generating a radio frequency equal to said fixed frequency, and switching means connected with said antenna and coupled to said generating means and actuated thereby to modulate the reflectivity of the antenna at said radio-frequency rate.

9. A ground-controlled-approach aircraft landing system including the combination as set forth in claim 8, wherein the radar is located on the ground and the beacon is located on the aircraft, said antenna being directional and facing forwardly thereof.

10. In a system as set forth in claim 8, switch means in the radar for selectively rendering the radar sensitive to one of said receive-frequencies, or to both simultaneously.

11. A beacon for receiving and reflecting high-frequency electromagnetic waves, comprising antenna means to receive said waves and having conductive paths carrying currents induced thereby; switching means connected across said conductive paths; and radio-frequency generating means coupled to and controlling said switching means to modulate the reflectivity of said antenna means at said radio-frequency rate.

12. In a beacon as set forth in claim 11, said antenna means comprising a waveguide horn; and said switching means comprising a short-circuiting component disposed across the wave-guide and having its conductivity controlled by said generating means.

13. In a beacon as set forth in claim 12, said short-circuiting component comprising a diode.

14. In a beacon as set forth in claim 12, said short-circuiting component comprising a ferrite strip, and a winding on said strip and coupled to said generating means to alternately saturate and unsaturate the strip.

15. In a beacon as set forth in claim 11, said antenna means comprising a Van Atta reflective array including antennas having interconnecting transmission paths; and said switching means comprising path-short-circuiting components having their conductivities controlled by said generating means.

16. In a beacon as set forth in claim 15, said short-circuiting components comprising diodes.

17. In a beacon as set forth in claim 15, said short-circuiting components comprising ferrite strips, and said strips each having a winding thereon coupled to said generating means to alternately saturate and unsaturate said strips.

18. A beacon for receiving and reflecting high-frequency electromagnetic waves, comprising high-frequency transmission line means; antenna means coupled to said transmission line means and matching the impedance of the transmission line means to that of the antenna means in free space; and means for varying the reflectivity of the line at a radio frequency rate.

19. A beacon for receiving and reflecting high-frequency electromagnetic waves, comprising tuned circuit means resonant at said high-frequency; antenna means coupled to said tuned circuit means; switching means coupled with said tuned circuit means for detuning the latter at said high-frequency; and radio-frequency generating means coupled to said switching means and alternately turning the latter on and off at said radio-frequency rate.

20. A beacon for receiving and reflecting high-frequency electromagnetic waves, comprising reflective antenna means; impedance means coupled to said antenna means to modulate the reflectivity thereof as a function of the conductivity of the impedance means; and radio-frequency oscillatory means coupled to said impedance means to vary the conductivity thereof at the rate of said radio-frequency.

References Cited in the file of this patent
UNITED STATES PATENTS

| | | |
|---|---|---|
| 2,461,005 | Southworth | Feb. 8, 1949 |
| 2,520,008 | King | Aug. 22, 1950 |
| 2,539,594 | Rines et al. | Jan. 30, 1951 |
| 2,850,728 | Wright | Sept. 2, 1958 |
| 2,910,690 | Ljungdahl | Oct. 27, 1959 |